No. 790,824. PATENTED MAY 23, 1905.
A. GIRARD & S. B. McCULLOUGH.
MULTIPLIER FOR DOBBY LOOMS.
APPLICATION FILED APR. 22, 1904.
6 SHEETS—SHEET 1.
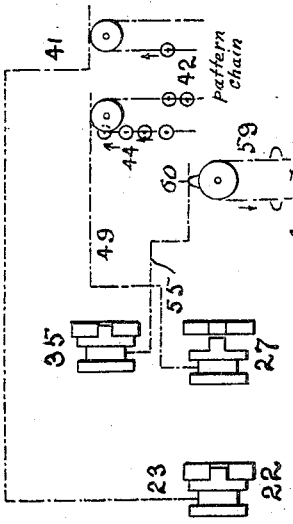
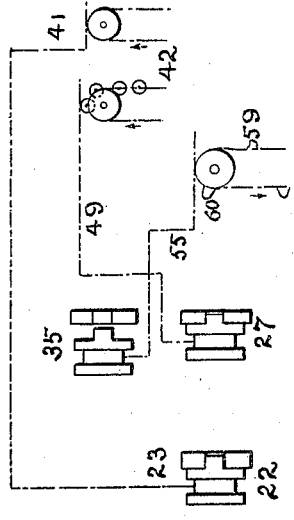
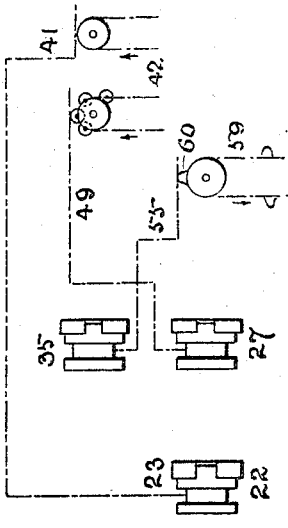
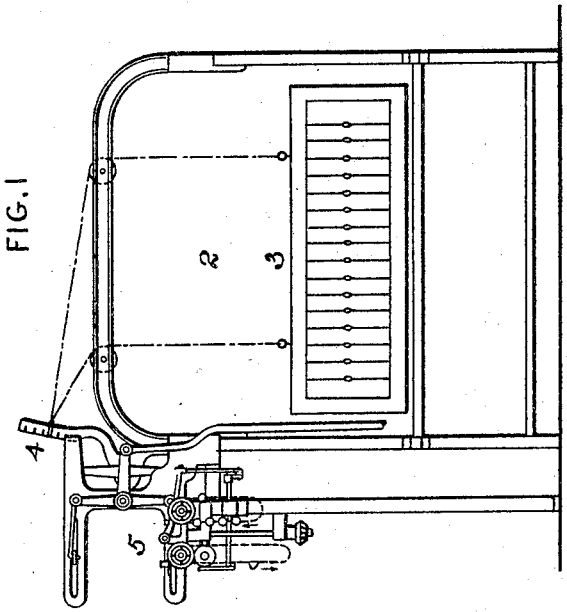
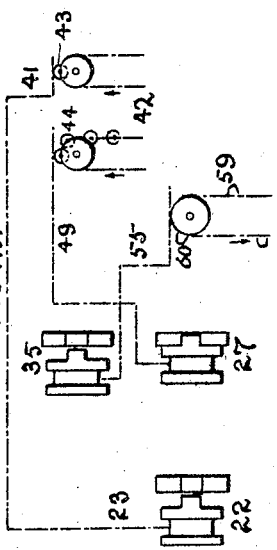
WITNESSES:
INVENTORS
Albert Girard & Saml. B. McCullough
BY
ATTORNEY.

No. 790,824. PATENTED MAY 23, 1905.
A. GIRARD & S. B. McCULLOUGH.
MULTIPLIER FOR DOBBY LOOMS.
APPLICATION FILED APR. 22, 1904.
6 SHEETS—SHEET 2.
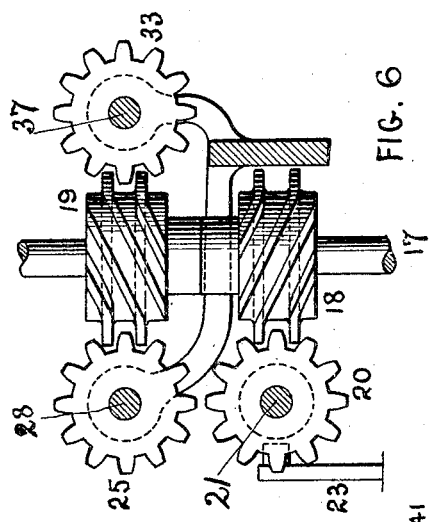
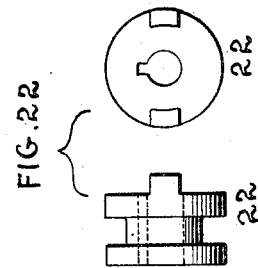
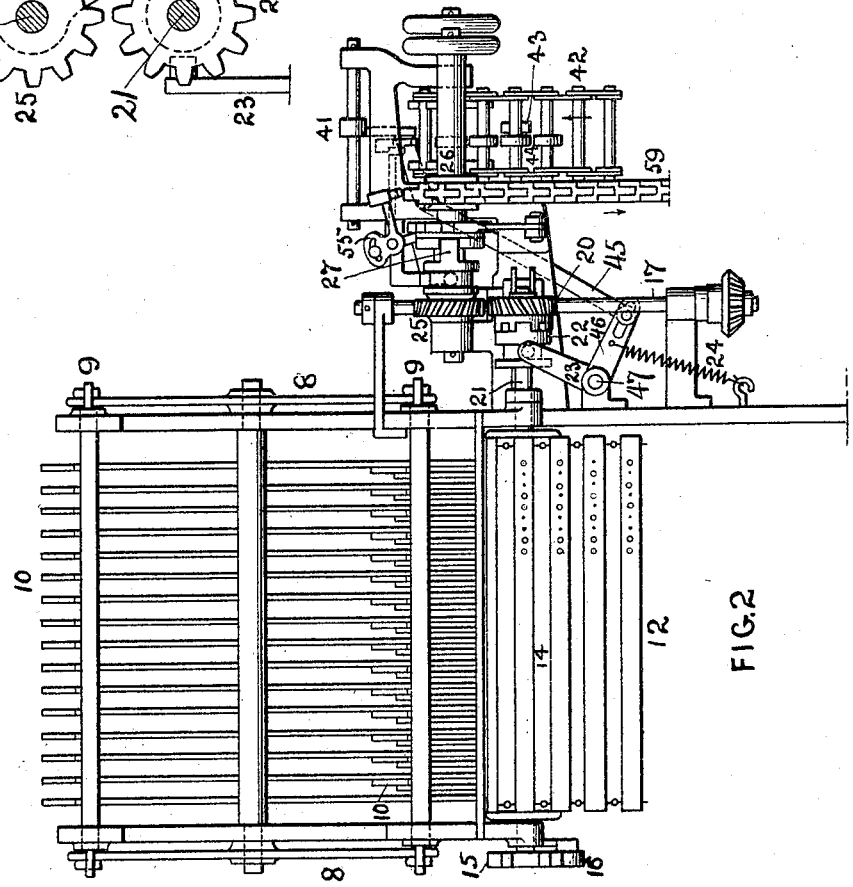
WITNESSES:
INVENTORS
Albert Girard and
Saml. B. McCullough
BY
ATTORNEY.

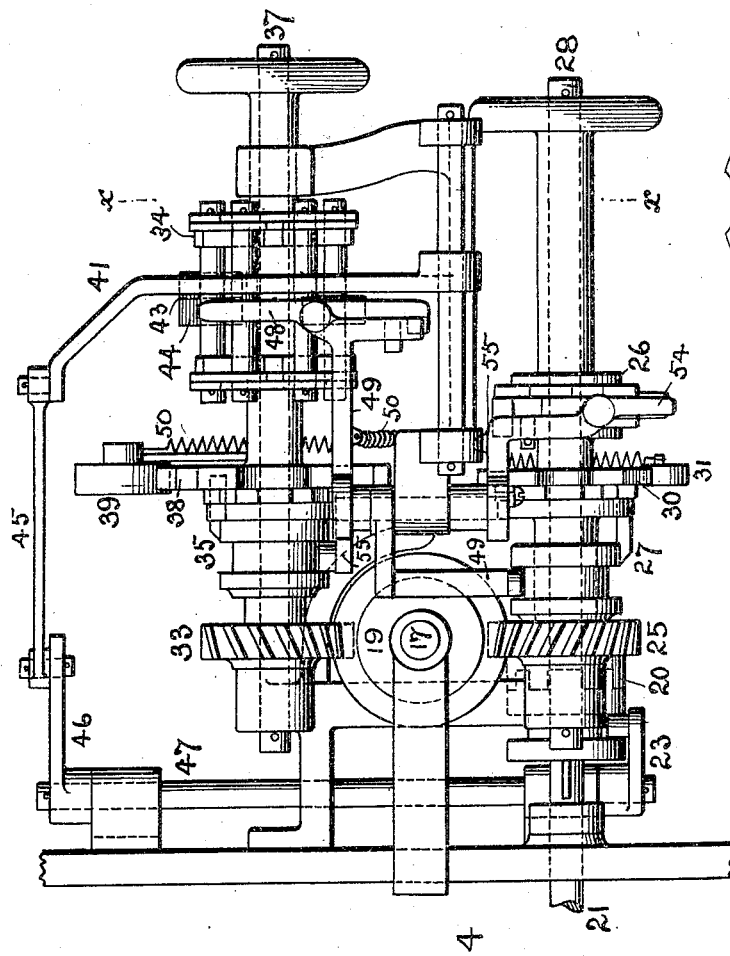

No. 790,824. PATENTED MAY 23, 1905.
A. GIRARD & S. B. McCULLOUGH.
MULTIPLIER FOR DOBBY LOOMS.
APPLICATION FILED APR. 22, 1904.
6 SHEETS—SHEET 4.
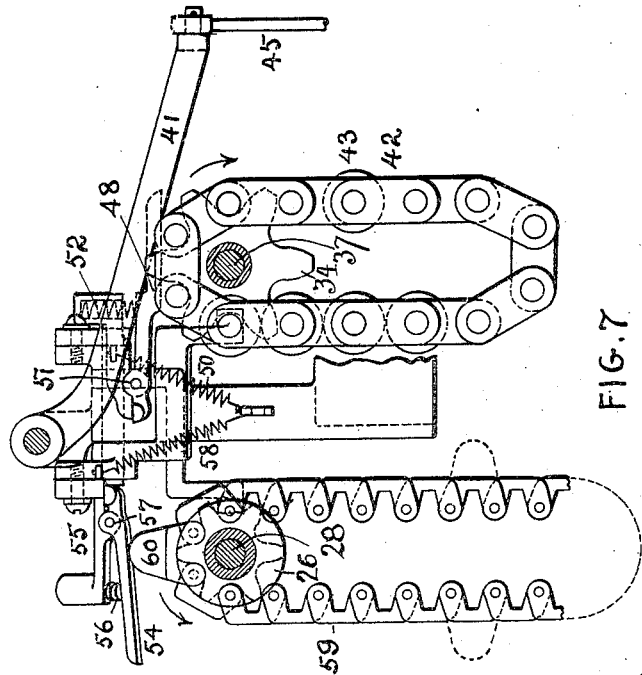
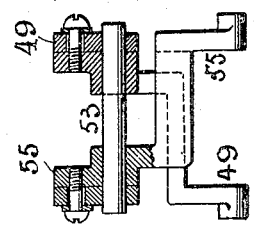
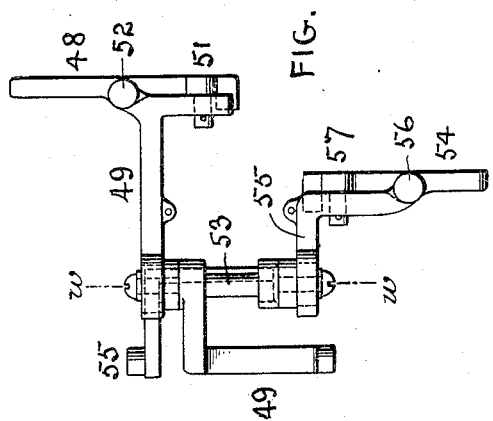
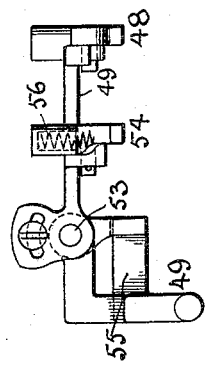
WITNESSES:
INVENTORS
Albert Girard & Saml. B. McCullough
BY
ATTORNEY.

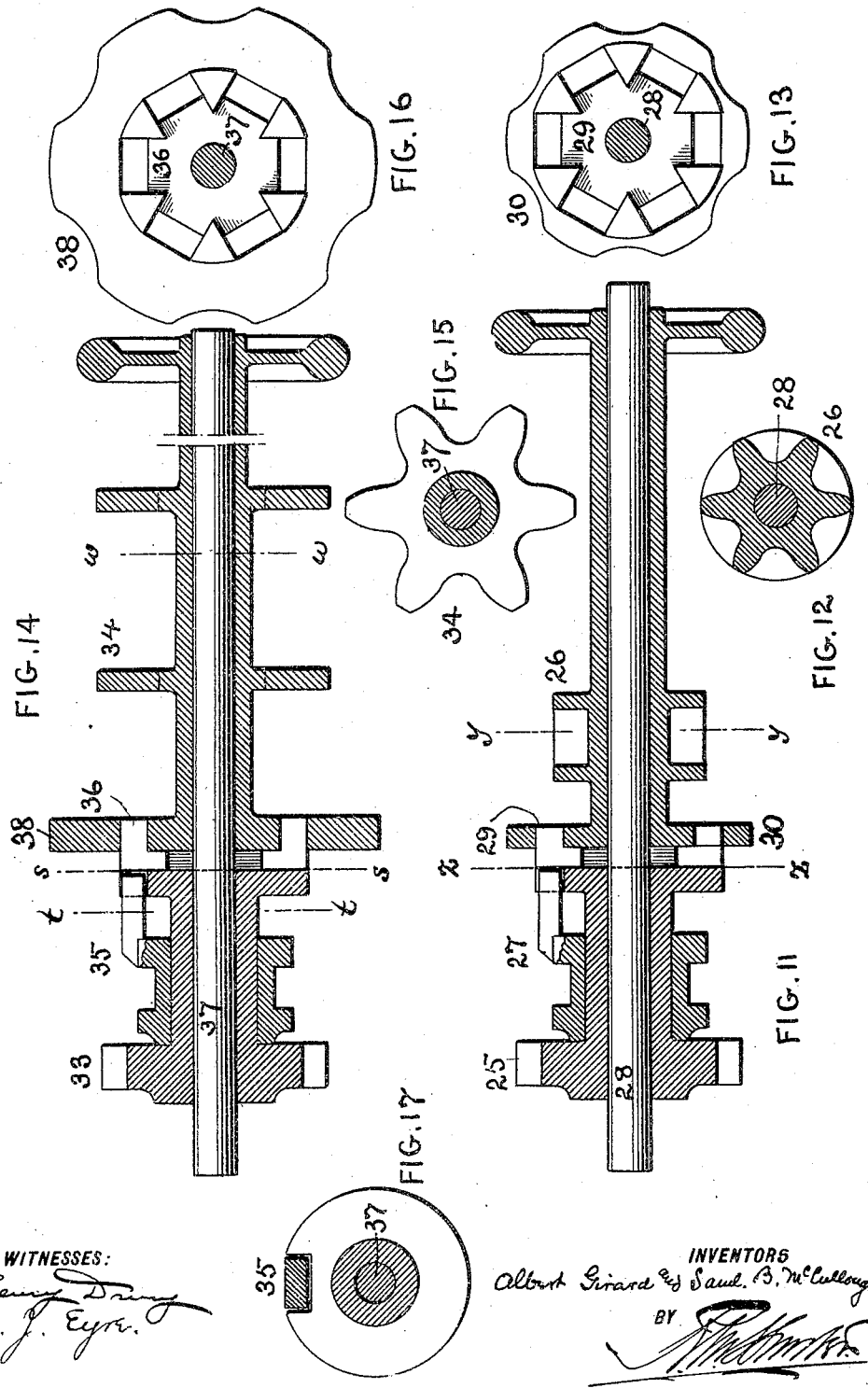

No. 790,824. PATENTED MAY 23, 1905.
A. GIRARD & S. B. McCULLOUGH.
MULTIPLIER FOR DOBBY LOOMS.
APPLICATION FILED APR. 22, 1904.
6 SHEETS—SHEET 6.
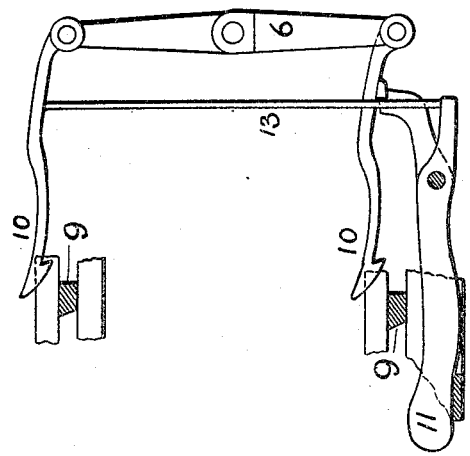
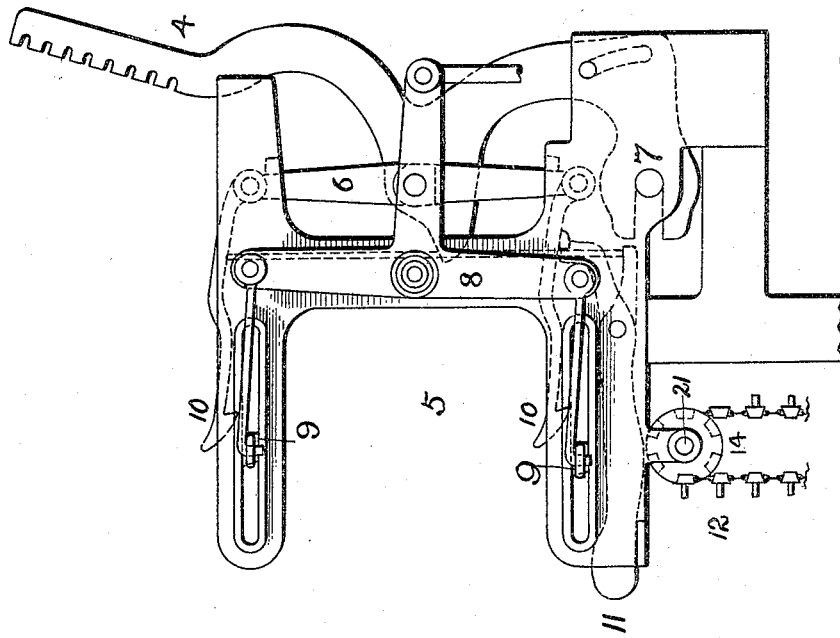

No. 790,824.

Patented May 23, 1905.

UNITED STATES PATENT OFFICE.

ALBERT GIRARD AND SAMUEL B. McCULLOUGH, OF CHESTER, PENNSYLVANIA.

MULTIPLIER FOR DOBBY-LOOMS.

SPECIFICATION forming part of Letters Patent No. 790,824, dated May 23, 1905.

Application filed April 22, 1904. Serial No. 204,325.

*To all whom it may concern:*

Be it known that we, ALBERT GIRARD and SAMUEL B. McCULLOUGH, of the city and county of Chester, State of Pennsylvania, have invented an Improvement in Multipliers for Dobby-Looms, of which the following is a specification.

Our invention has reference to multipliers for dobby-looms; and it consists of certain improvements which are fully set forth in the following specification and shown in the accompanying drawings, which form a part thereof.

The object of our invention is to provide a loom of this character with automatic pattern-controlling mechanism, whereby the pattern-chain which directly controls the heddle-frames may be thrown out of operation for definite periods during the weaving of the ground between the successive patterns or figures in the length of the fabric to reduce the number of the pattern-bars required and the wear and tear upon the pattern mechanism.

Our invention is a specific improvement upon the construction of loom set out in the patent to H. Wyman, No. 656,592, dated August 21, 1900, and comprehends certain improvements for controlling an intermediate operation of the chain of pattern-bars under the control and direction of the pattern-chain.

In carrying out our invention we combine with a dobby-loom of usual construction a clutch intermediate of the pattern-cylinder for the chain of pattern-bars and its driving-shaft, said clutch being operated at intervals by the pattern or box chain which regulates the beginning of a pattern and thrown out of action by the influence of the ground or multiple chain indirectly exerted through said pattern or box chain.

Our invention also comprehends details of construction which, together with the features above specified, will be better understood by reference to the drawings, in which—

Figure 1 is an elevation of a portion of a dobby-loom. Fig. 2 is an elevation of the pattern mechanism complete embodying our invention. Fig. 3 is an elevation of the friction-brake for the pattern-drum. Fig. 4 is a plan view of a portion of the pattern mechanism shown in Fig. 2, embodying our invention. Fig. 5 is a sectional elevation of the brake devices for the pattern-chain wheel and ground-chain wheel. Fig. 6 is a sectional elevation showing the usual driving gearing for the pattern and ground chain wheels. Fig. 7 is a cross-section on line $x\,x$ of Fig. 4 of the pattern mechanism. Figs. 8, 9, and 10 are detail views of the multiple and box lifts, the latter being a section on line $w\,w$ of Fig. 8. Fig. 11 is a longitudinal section of the ground-chain-operating devices. Fig. 12 is a cross-section of same on line $y\,y$. Fig. 13 is a cross-section of same on line $z\,z$. Fig. 14 is a longitudinal section of the pattern-chain-operating devices. Fig. 15 is a cross-section of same on line $w\,w$. Fig. 16 is a cross-section of same on line $s\,s$. Fig. 17 is a cross-section of same on line $t\,t$. Figs. 18, 19, 20, and 21 are diagrams illustrating the relative positions of the clutches of the pattern mechanism. Fig. 22 shows detail views of one of the clutches. Fig. 23 is a side elevation of the pattern-controlled heddle-operating mechanism; and Fig. 24 is a detached view of a portion of same, showing the hooked jacks, knife-bar, and indicator-latch.

The general construction of the loom here shown is what is technically known as a "dobby-loom" for weaving figured goods, and said loom as improved employs a chain of pattern-bars to govern the particular heddle frame or frames to be raised, a pattern or box chain to put the chain of pattern-bars into and out of operation, and a ground-chain to control the operation of the pattern or box chain, and vice versa. In this manner the chain of pattern-bars need be only sufficient in number to produce the pattern desired, the ground being woven without moving said bars, and said bars are quickly put into and out of operation respectively at the beginning and ending of the weaving of the pattern and at each repeat thereof, said operation being secured by the mechanism constituting the essential features of our invention.

The heddle-frames 3 of the loom 2 are raised and lowered by the harness-levers 4. These levers are pivoted at 7 and hinged to connectors 6, provided on their ends with hooked jacks 10. These jacks are raised and lowered by the indicator-latches 11, the lower jacks being operated directly and the upper ones by the needles 13. The indicator-latches are directly operated by pins on the chain 12 of the pattern-bars, which are moved by the pattern-cylinder 14. A brake-wheel 15 on the end of the cylinder and a spring-actuated brake-arm 16 prevent spinning of the said cylinder and its chain of pattern-bars. 8 is a lever which is continuously oscillating and reciprocates the knife-bars 9 simultaneously in opposite directions. The presence of a pin in the pattern-bars will allow a jack 10 to fall and be engaged by the knife-bar and in that manner operate the harness-lever to lift the heddle-frame. The pattern-bars of the chain 12, which governs the weaving of the ground, have the pins arranged so that two adjacent pins are "in" and the next two "out," and so on, which will cause every alternate one of the lower jacks to be in position to be operated by the lower reciprocating knife-bar and likewise cause every alternate one of the upper jacks to be in position to be operated by the upper knife-bar. In this manner the normal reciprocations of the knife-bars will so operate the heddles as to form simple sheds for the shuttle to weave the ground.

The shaft 21 of the pattern-cylinder is rotated by a worm-wheel 20 through a clutch 22, which is thrown into and out of action by a crank 23, which is moved in one direction by a rock-shaft 47, arm 46, link 45, lever 41, and pattern or box chain 42, carrying special pattern-wheels 43, and in the other direction by a spring 24, connected with arm 46. In this manner the clutch 22 is closed, except when a pattern-wheel 43 is under the lever 41, at which latter time the loom will be weaving ground alone. The worm-wheel 20 is driven by a worm 18, Fig. 6, having its teeth so formed that the worm-wheel 20 is rotated intermittently, so as to bring a pattern-bar into operative position and then remain in such position for a given period. This worm 18 is secured to and rotated by a shaft 17, which is operated in any suitable manner from the loom-driving devices.

The mechanism above described constitute the essential improvements of our invention when combined with the pattern or box chain mechanism and the ground or multiple chain mechanism, to which we will now refer.

The box or pattern chain 42 is operated by a chain-drum 34, sleeved on a stationary shaft 37. This drum has a brake-wheel 38 and a clutch-socket 36. This drum is driven by worm-wheel 33 through clutch 35, engaging with the socket 36. The worm-wheel 33 is driven by a worm 19 on shaft 17 in an intermittent manner. The pattern-chain 42 has a series of wheels 44, which operate on the box-lift mechanism to operate the clutch 27 to put the multiple or ground chain 59 into or out of operation in the manner described later on.

The multiple or ground chain 59 is operated by a drum 26, sleeved on a stationary shaft 28, and this drum is provided with a brake-wheel 30, having a clutch-socket 29, with which engages a clutch 27 and by which the drum is driven from a worm-wheel 25 and the worm 19. By reference to Figs. 4 and 6 it will be seen that the worm-wheels 25 and 33 are intermittently rotated with a step-by-step motion and that when one is being rotated the other is at rest, and vice versa. The ground-chain 59 is provided with a projection 60, which operating on the multiple-lift mechanism shifts the clutch 35 to put the pattern-chain drum 34 into operation, as described more in detail hereinafter.

The brake-wheel 38 of the pattern-chain 42 operates in combination with a brake-arm 39 and spring 40, and brake-wheel 30 of the ground-chain 59 operates in combination with a brake-arm 31 and spring 32 to prevent the chain-drums from spinning.

The box-lift and multiple-lift mechanism are shown in detail in Figs. 8 to 10, from which it will be seen that they are essentially cranked levers. The box-lift comprises a lever 49, sleeved on shaft 53 and having one end adapted to the groove in the clutch 27 and the other end provided with a shoe 48, hinged to lever 49 at 51 and combined with a spring-cushion 52 to reduce the wear from the upward blow of the wheels 44 of the pattern or box chain 42. A spring 50 operates upon the lever 49 to cause it to keep the clutch 27 out of driving connection with the ground-chain drum 26. The multiple lift is constructed in the same manner and consists of the cranked lever 55, sleeved on the shaft 53 and having one end engaging the groove in the clutch 35 of pattern-chain drum 34 and the other end provided with the shoe 54, pivoted to it at 57 and having a spring-cushion 56 to relieve the upward blow of the projection 60 of the ground-chain 59.

In Fig. 7 it will be seen that the projection 60 of the ground-chain 59 has lifted the shoe 54 of the multiple-lift lever 55 against the action of the spring 58, and in Fig. 4 it will be seen that this has caused the clutch 35 to be moved to put the pattern-chain 42 into action. The condition of the parts at this time is as indicated in Fig. 20 and at which time the loom is weaving patterns. The pattern-chain 42 will be now in motion, as will be all the chains. As the ground-chain 59 moves the projection 60 passes from under the multiple lift and the clutch 35 is released, as shown in Fig. 19, and the pattern-chain 42 comes to rest, the arm 41 being down, and the pattern continues to be woven. In due time the projection 60 once more operates the clutch 35 to put the pattern-chain 42, in motion, and the parts are as shown in Fig. 18; but as soon as the pattern-chain 42 begins to move it brings a wheel 43 under the arm 41 and throws the clutch 22 out and arrests the chain of pattern-bars 12, and the weaving of the pattern ceases for the time being. This condition is indicated in Fig. 21. So long as the clutch 22 is out the ground will continue to be woven. However, it will be observed that the clutch 27 is in and the ground-chain drum 26 is rotating. This in time brings the projection 60 of the ground-chain 59 in position to operate upon the multiple lift, and then the pattern-chain 42 is again moved. If it is provided with wheels 44 under the box-lift, it will retain the ground-chain 59 in operation, and if it has no wheel 43 under the arm 41 then the clutch 22 will be thrown in and the condition shown in Fig. 20 will result. The pattern now continues to be woven until a wheel 43 of the pattern-chain 42 throws out the clutch 22, after which weaving of the ground begins. If the clutch 35 is closed, as shown in Fig. 18, the pattern-chain 42 may continue to move so long as no wheels 44 are arranged to operate the box-lift, because this clutch 35 would remain in the position shown until liberated by movement of the ground-chain 59, and this chain cannot move until its clutch 27 is moved by a wheel 44 of the pattern-chain 42. It will thus be seen that the ground-chain 59 governs the movement of the pattern or box chain 42, and hence regulates the time of inaction of the clutch 22 and weaving of the ground without pattern. This is governed by the number of links in the ground-chain 59 with one projection 60 or the number of links between the projections. On the other hand, during the weaving of the pattern the pattern-chain 42 determines the number of picks or throws of the shuttle, and the moment they are completed the ground-clutch 27 is thrown out and ground-weaving commences. The two chains 42 and 59 are alternately moved for given periods, according to the number of picks in the pattern and in the ground between successive patterns, but are never moved together except at moments of throwing one into action and the other out. The two working conditions are Fig. 18 for the pattern and Fig. 21 for the ground.

While we prefer the construction shown as being excellently adapted for the purposes of our invention, we do not limit ourselves thereto, as the details may be modified or varied without departing from the spirit of our invention.

Having now described our invention, what we claim as new, and desire to secure by Letters Patent, is—

1. In a loom of the character described, the combination of a chain of pattern-bars for controlling the weaving of the ground or pattern, a box-chain, a multiple chain, shafts for independently operating said three chains, a continuously-rotating driving-shaft operated by the loom-driving mechanism, separate worm and worm-wheel gearing between the driving-shaft and each of said three chains operating shafts, devices for putting the box-chain into and out of operation controlled by the multiple chain, devices for putting the multiple chain into and out of operation controlled by the box-chain, a clutch for putting the shaft for operating the chain of pattern-bars into and out of operation at predetermined intervals, and means controlled by the box-chain for operating said clutch.

2. In a loom of the character described, the combination of a chain of pattern-bars for controlling the weaving of the ground or pattern, a box-chain, a multiple chain, shafts for independently operating said three chains, a continuously-rotating driving-shaft operated by the loom-driving mechanism, separate worm and worm-wheel gearing between the driving-shaft and each of said three chains operating shafts, devices for putting the box-chain into and out of operation controlled by the multiple chain, devices for putting the multiple chain into and out of operation controlled by the box-chain, a clutch for putting the shaft for operating the chain of pattern-bars into and out of operation at predetermined intervals, means controlled by the box-chain for operating said clutch consisting of a spring to move the clutch in one direction, lever mechanism for moving the clutch in the other direction, and means on the box-chain for operating the lever mechanism at predetermined intervals.

3. In a loom of the character described, the combination of the chain of pattern-bars for controlling the weaving of the pattern and ground, a box-chain, a multiple chain, means for operating said box and multiple chains and controlling their movements one by the other, a shaft for operating the chain of pattern-bars, a continuously-rotating driving-shaft, worm and worm-wheel gearing between said shafts, a clutch for putting the shaft for operating the chain of pattern-bars into or out of operation, a spring to throw said clutch into clutching position, and lever mechanism for throwing said clutch out of clutching position operated by the box-chain.

4. In a loom of the character described, the combination of the chain of pattern-bars for controlling the weaving of the pattern and ground, a box-chain, a multiple chain, means for operating said box and multiple chains and controlling their movements one by the other, a shaft for operating the chain of pattern-bars, a continuously-rotating driving-shaft, worm and worm-wheel gearing between said shafts, a clutch for putting the shaft for operating the chain of pattern-bars into or out of operation, a spring to throw said clutch into clutching position, and lever mechanism for throwing said clutch out of clutching position operated by the box-chain consisting of the arm 23, shaft 47, arm 46, link 45, and lever 41 adapted to be operated by a wheel on the box-chain.

In testimony of which invention we hereunto set our hands.

ALBERT GIRARD.
S. B. McCULLOUGH.

Witnesses:
R. M. HUNTER,
R. M. KELLY.